United States Patent [19]

Boucek et al.

[11] 3,905,024

[45] Sept. 9, 1975

[54] CONTROL OF DEVICES USED AS COMPUTER MEMORY AND ALSO ACCESSED BY PERIPHERAL APPARATUS

[75] Inventors: Richard A. Boucek, Clarendon Hills; John S. Young, Addison, both of Ill.

[73] Assignee: GTE Automatic Electric Laboratories Incorporated, Northlake, Ill.

[22] Filed: Sept. 14, 1973

[21] Appl. No.: 397,568

[52] U.S. Cl. .......................... 340/172.5; 340/173 R

[51] Int. Cl.² ...................... G11C 7/00; G11C 11/40

[58] Field of Search ...... 340/172.5, 173 R, 173 AM

[56] References Cited

UNITED STATES PATENTS

| | | | |
|---|---|---|---|
| 3,678,467 | 7/1972 | Nussbaum et al. | 340/172.5 |
| 3,681,763 | 8/1972 | Meade | 340/173 R |
| 3,699,535 | 10/1972 | Klein | 340/172.5 |
| 3,699,545 | 10/1972 | Kluge | 340/173 AM |
| 3,701,984 | 3/1971 | Burns | 340/172.5 |
| 3,713,114 | 1/1973 | Linton et al. | 340/173 R |
| 3,763,472 | 10/1973 | Sharp | 340/172.5 |

*Primary Examiner*—Gareth D. Shaw
*Assistant Examiner*—Mark Edward Nusbaum
*Attorney, Agent, or Firm*—John T. Winburn

[57] ABSTRACT

A word store comprises flip-flops which consist of NAND gates, each flip-flop having two sets of inputs, with a clock and data input for each set, and two separately gated outputs. The first set of inputs and the first output are connected for computer access, while the other inputs and output are connected to peripheral apparatus. The computer may change one or more bits by reading the entire word, modifying individual bits, and writing back the entire word. The peripheral apparatus may set individual bits to selected states. To ensure that changes made by the peripheral apparatus are effective if its operation overlaps that of the computer, its clock pulse has a duration exceeding the maximum interval used by the computer for read-modify-write.

1 Claim, 4 Drawing Figures

TRAFFIC OFFICE MATRIX--WORD W15

CONTROL OF DEVICES USED AS COMPUTER MEMORY AND ALSO ACCESSED BY PERIPHERAL APPARATUS

BACKGROUND OF THE INVENTION

1. Field of the Invention

This invention relates to control of dual access matrix points, which are bistable devices addressed as memory by a computer, the same devices being accessed by peripheral apparatus.

2. Description of the Art

A problem with the use of dual access word stores is that the computer may modify a word by reading it from its store, modifying it, and then writing it back in the same store; and in the meantime the peripheral apparatus may change the state of a device, and the change becomes nullified by the computer writing back the bits for these devices as they were when read by the computer.

SUMMARY OF THE INVENTION

According to the invention, a set of the dual access matrix points are treated as a word store of memory by the computer, and if any part of the word is to be changed the word is first read, modified in the computer, and then written back into the same word store. The peripheral apparatus may change the state of individual devices of the same store with individual data and clock inputs. To prevent nullification of the change by the computer, the clock pulse from the peripheral apparatus has a duration exceeding the maximum interval used by the computer in the read-modify-write sequence.

CROSS REFERENCE TO RELATED APPLICATIONS

This invention is included in a TSPS system briefly described in the GTE Automatic Electric Technical Journal, Vol. 12, No. 7, July 1971, pages 276–285.

The central processor and peripheral controller are disclosed in U.S. Pat. No. 3,818,455 for a Control Complex for TSPS Telephone System, by E. F. Brenski et al.

The data link for communication of data between operator's positions and central control is disclosed in a U.S. application by M. Winn, W. R. Wedmore, and J. S. Young for Data Link Arrangement with Error Checking and Retransmission Control, Ser. No. 397,454 filed the same day as this application.

DETAILED DESCRIPTION

Figure 1:
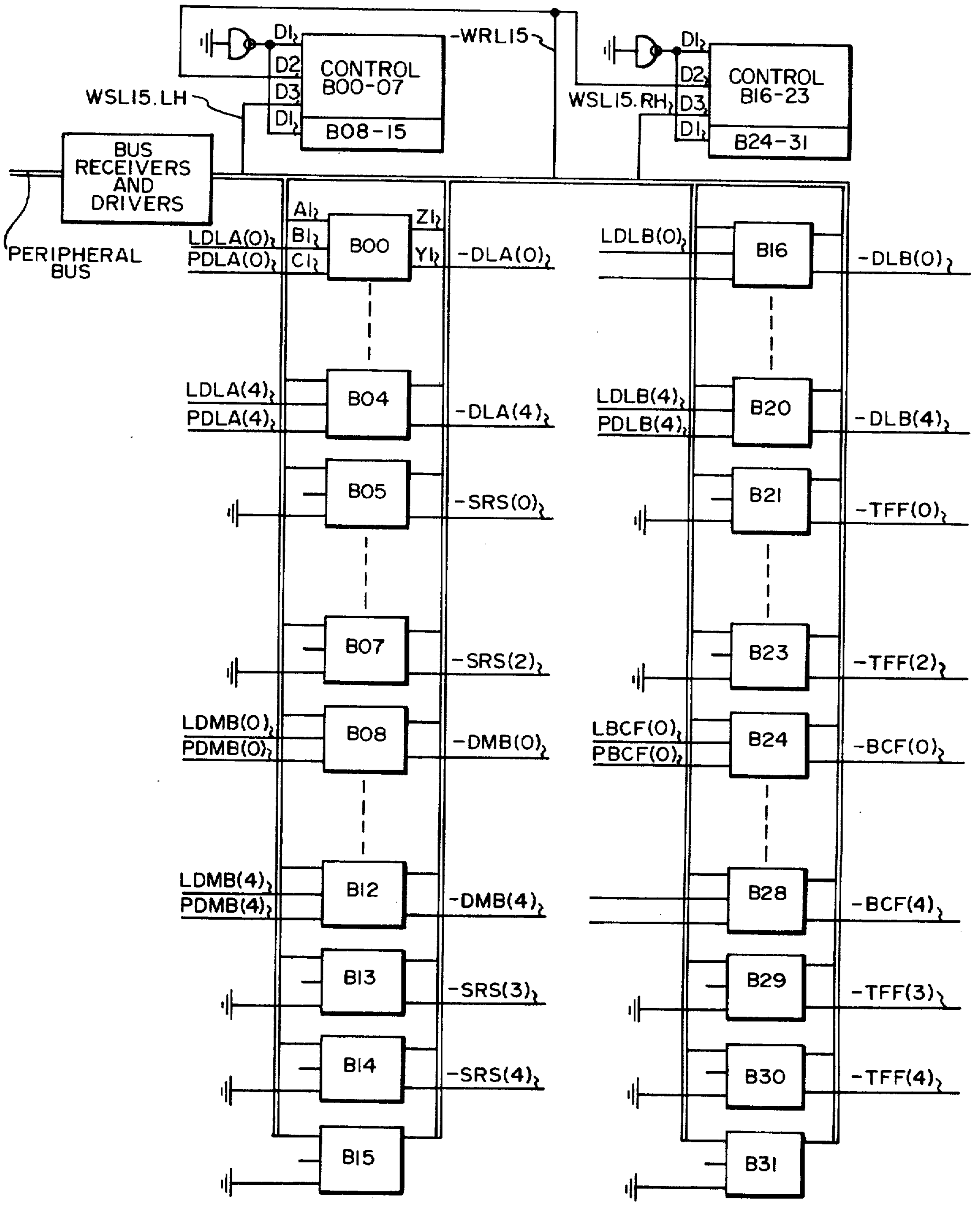
FIG. 1 is a functional block diagram of a word store using dual access matrix points.

A word store is shown in FIG. 1 comprising 32 bistable devices B00-B31.

Figure 2:
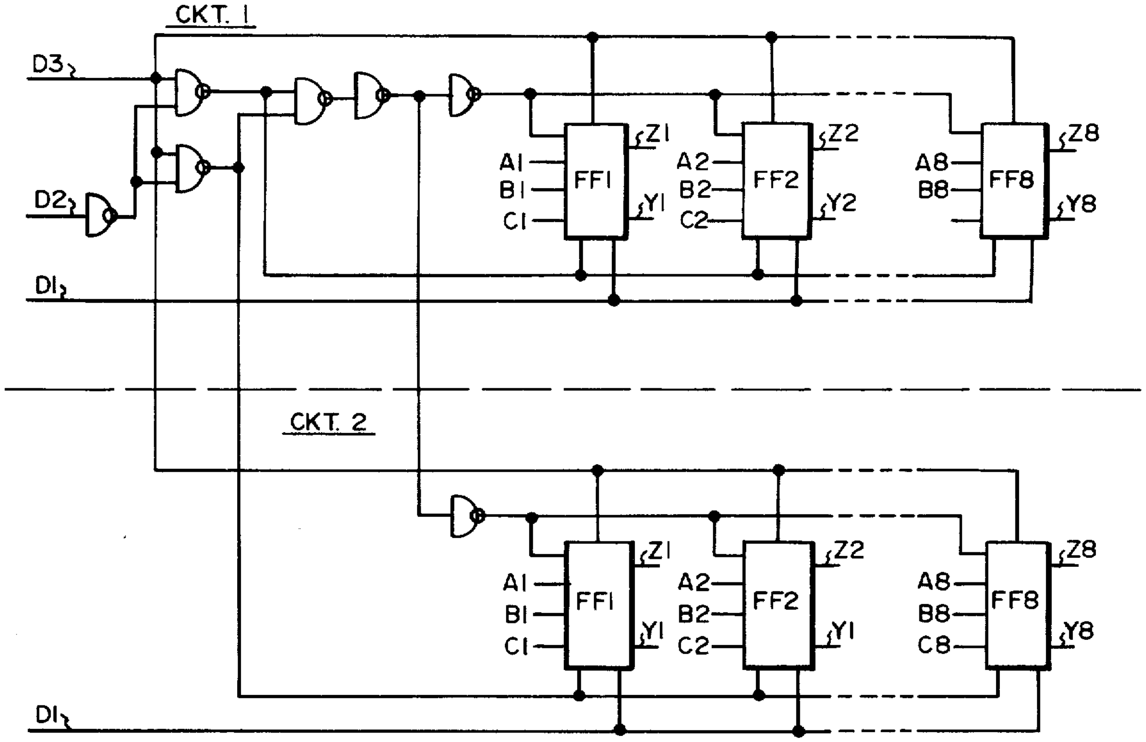
FIGS. 2 and 3 are functional block diagrams showing the circuit for the dual access matrix points.
Figure 3:
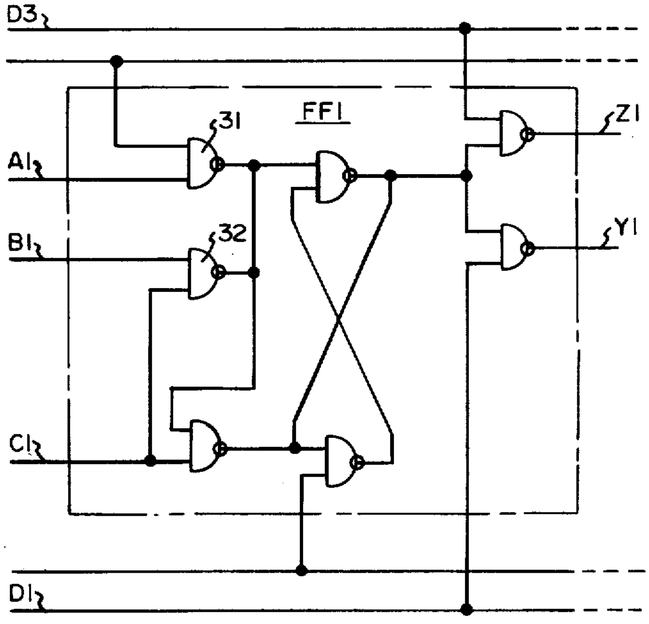

The building block standard printed circuit cards for use in the word store include a control register made up of two-input NAND gates as shown in FIGS. 2 and 3. There are two interconnected circuits on a card, each of which comprises eight bistable latch type devices designated as flip-flops FF1-FF8. The circuit for one of these devices is shown in FIG. 3.

The inputs A*i*, B*i*, C*i*, and outputs Y*i* and Z*i* are individual to each bistable device where *i* has values 1 to 8, the input D1 is individual to each of the two circuits on a card but common to all eight bits of a circuit, and inputs D2 and D3 control both the circuits on the card.

The data A*i* are gated in by the coincidence of D2, D3, and are latched in at the trailing edge of D2, D3. The data B*i*, and clock C*i* provide control to individual bits. Data B*i* are gated in by the leading edge of clock C*i* and are latched in at the trailing edge of C*i*. The outputs Z*i* are activated by D3 and are fanning out to logic gates. The outputs Y*i* are activated by D1 and they also fan out to logic gates. The circuit comprises high threshold integrated circuits NAND gates.

The high threshold logic integrated circuits are designed for use in high electromechanical noise environments and in the implementation of electronic-to-electromechanical interface circuits. The high noise immunity is the result of the large signal amplitude and the input hysteresis characteristic of the gate circuit. The positive or negative noise margins are a minimum of 6 volts. The family is designed to operate over the temperature range of 0°C to 75°C with a nominal propagation delay of 100 nanoseconds. Only one power supply of +12 volts is required.

The circuit comprises four transistors. The inputs comprise a diode AND gate (for positive logic in which "1" is a positive voltage and a "0" is ground potential), and the transistors provide an inverting amplifier so that the complete circuit is a NAND gate. The first transistor has its emitter connected to the diode gate and its collector coupled via a Zener diode to the base of the second transistor. The second and third transistors each have their emitter connected to the base of the next stage, and the last transistor has its emitter connected to a ground and the output at the collector has a pull up resistor. Resistors and diodes provide bias connections to a +12 volts and ground.

The circuits may be connected together at the output to perform the OR function for 0's, as shown in FIG. 3 for gates 31 and 32.

The common circuits on the cards are symbolized in FIG. 1 by control blocks. The word store comprises two cards, with B00–B07 and B08–B15 being the two circuits on one card and B16–B23 and B24–B31 being the two circuits on the other card.

The details of associated circuits for input and output are shown in said co-pending applications. Bus drivers and receivers couple the common D2 and D3 inputs as well as the individual A*i* inputs and Z*i* outputs to a peripheral bus which is coupled to the control center including a computer. The B*i* and C*i* inputs and Y*i* outputs are coupled to peripheral apparatus comprising a data link. In this word store the D1 inputs are always true so that the Y1 outputs are always present.

Figure 4:
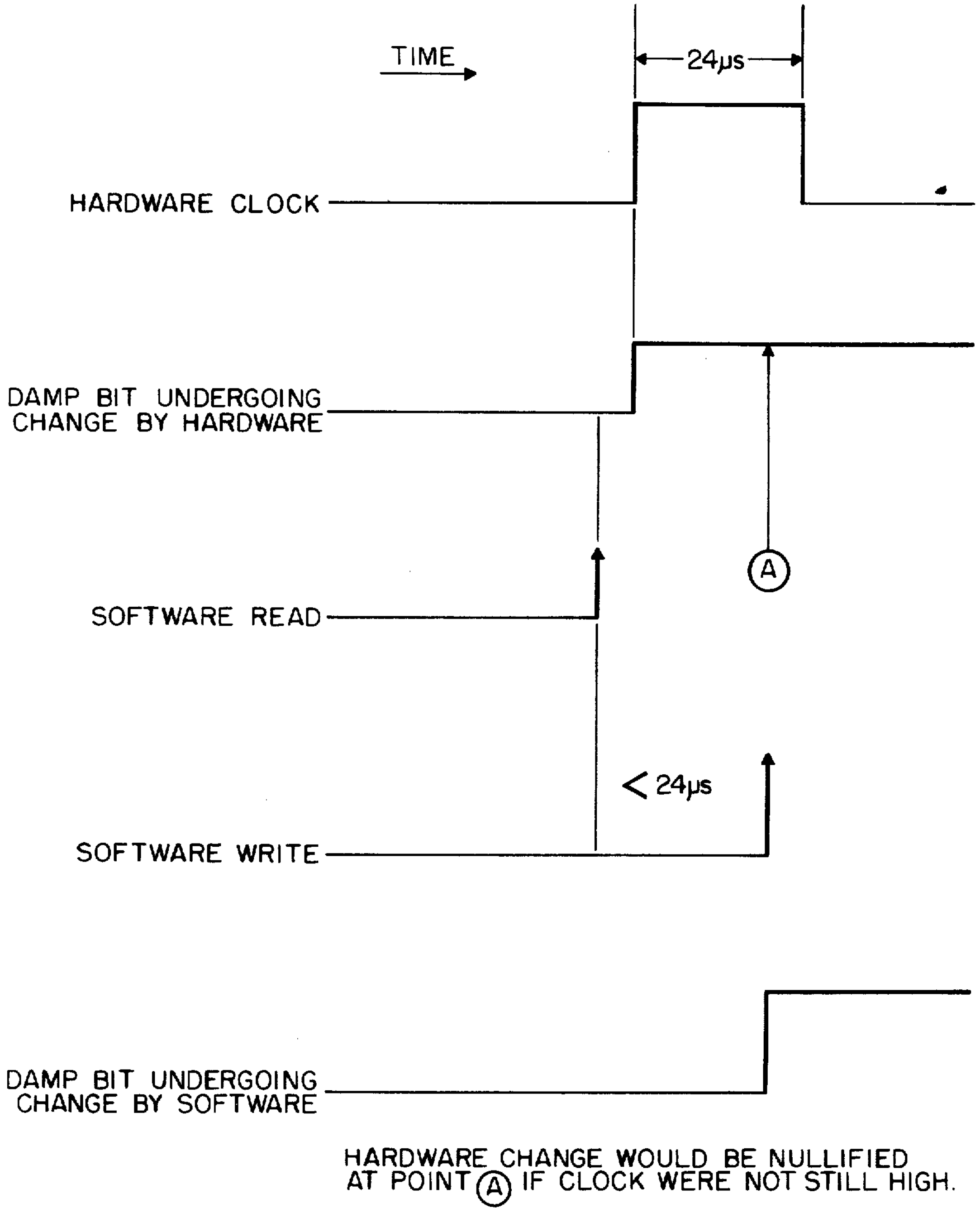
FIG. 4 is a timing diagram illustrating the operation in the event of overlapping access.

FIG. 4 illustrates the timing relationships involved in asynchronous operations of hardware and software.

Assume that the contents of a Dual Access Matrix word are read into a central processing unit CPU register immediately preceding the change of state of a particular bit in that word by hardware action. Such a change occurs on the leading edge of the hardware clock.

If the software action required is the change of state of some other bit(s), the procedure is to make appropriate modifications in the CPU register, then write the contents of that register (32 bits) back into the matrix.

Since the hardware change occured after the READ operation, the software WRITE will attempt to return the bit to its previous state. This is prevented by making the hardware clock pulse longer than the software read to write interval.

The sketch shows positive going (set) transitions for the DAMPS;

the same logic applies if negative (reset) transitions are made. This is a particularly useful in the Traffic Office Matrix, where up to 5 independent hardware groups set flag bits in the same word, as explained in said Data Link patent application.

What is claimed is:

1. A word store coupled to a computer and to a peripheral unit, said word store comprising:

at least one circuit comprising a plurality of dual access matrix points, each matrix point being a bistable device having a first clock input, a first data input, a second data input, a second clock input, a first output, a second output, a first gating input, and a second gating input;

said word store having a common clock input coupled to said first clock inputs, a first common gating input coupled to said first gating input, and a second common gating input coupled to said second gating inputs;

said computer is coupled to said common clock input, said first data inputs, said first common gating input, and said first outputs;

said peripheral unit is coupled to said second clock inputs, said second data inputs, said second common gating input, and said second outputs;

said computer including means to modify one or more bits of a data word stored in said word store including means to read the entire data word coupled to said first common gating input so that the data word appears at said first outputs, means to modify the selected bits in the computer, and means to write the entire word back by placing the data at said first data inputs and including means supplying a clock signal at said common clock input, said read-modify-write operation having a predetermined maximum clock pulse interval; and said peripheral unit including means to set one or more of said bistable devices to selected states in said word store by placing data at said second data inputs and including means supplying a clock pulse at said second clock inputs of only the selected devices, said clock pulses from said peripheral unit having a fixed predetermined maximum clock pulse interval greater than said computer read-modify-write clock pulse interval to make the state selected by the peripheral unit effective when both the computer and peripheral unit access said word store simultaneously with overlapping operation.

* * * * *